No. 794,357. PATENTED JULY 11, 1905.
H. H. HUGHES.
MEANS FOR PREVENTING SMOKE.
APPLICATION FILED MAY 31, 1904.

5 SHEETS—SHEET 1.

WITNESSES:
Gladys Walton

INVENTOR
Herbert H. Hughes
BY Hugh K. Wagner
his ATTORNEY.

No. 794,357. PATENTED JULY 11, 1905.
H. H. HUGHES.
MEANS FOR PREVENTING SMOKE.
APPLICATION FILED MAY 31, 1904.
5 SHEETS—SHEET 3.

WITNESSES:
Carl Krauss
Gladys Walton

INVENTOR:
Herbert H. Hughes
BY
Hugh K. Wagner
ATTORNEY.

No. 794,357. PATENTED JULY 11, 1905.
H. H. HUGHES.
MEANS FOR PREVENTING SMOKE.
APPLICATION FILED MAY 31, 1904.
5 SHEETS—SHEET 4.
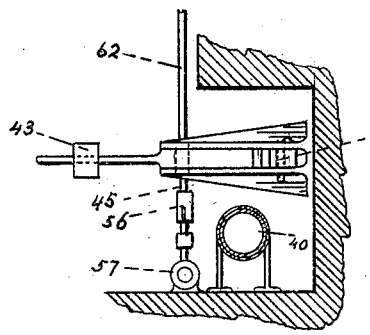
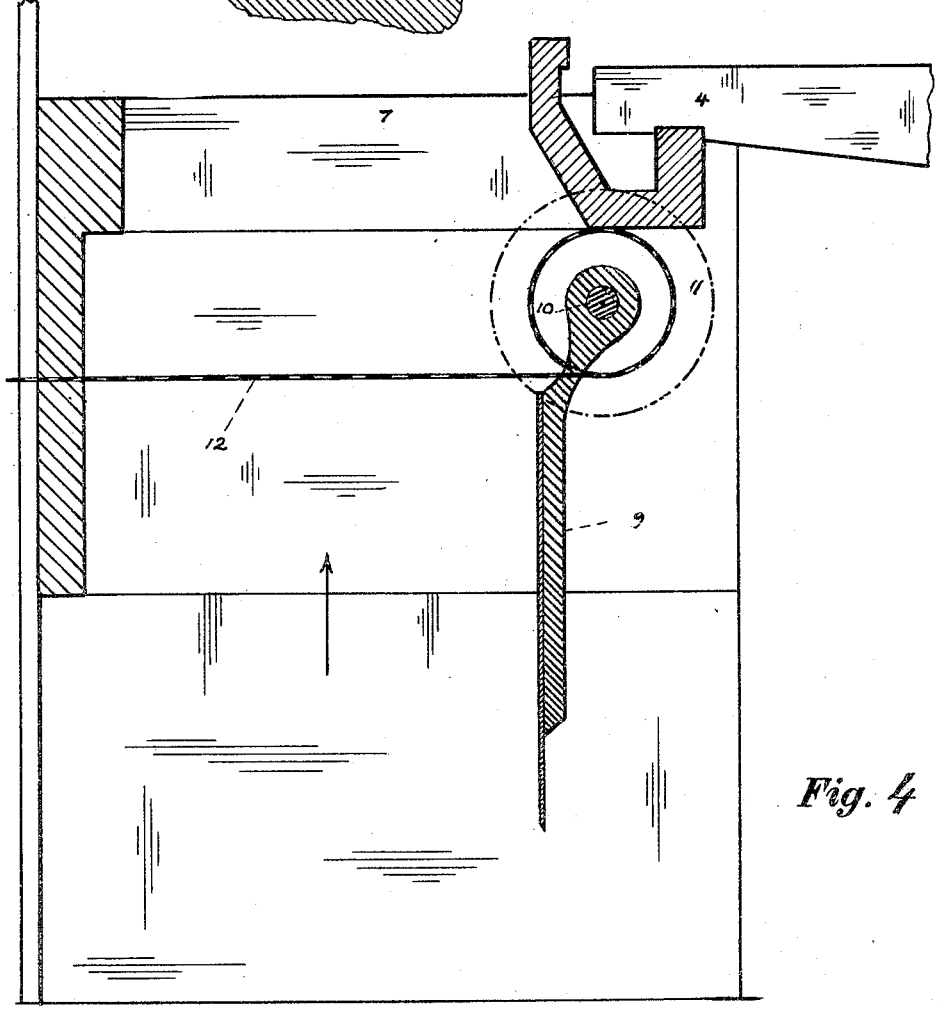

No. 794,357. PATENTED JULY 11, 1905.
H. H. HUGHES.
MEANS FOR PREVENTING SMOKE.
APPLICATION FILED MAY 31, 1904.

5 SHEETS—SHEET 5.

WITNESSES:

INVENTOR:
Herbert H. Hughes,
BY Hugh K. Wagner
His ATTORNEY.

No. 794,357.

Patented July 11, 1905.

UNITED STATES PATENT OFFICE.

HERBERT H. HUGHES, OF ST. LOUIS, MISSOURI.

MEANS FOR PREVENTING SMOKE.

SPECIFICATION forming part of Letters Patent No. 794,357, dated July 11, 1905.

Application filed May 31, 1904. Serial No. 210,346.

*To all whom it may concern:*

Be it known that I, HERBERT H. HUGHES, a citizen of the United States, residing in the city of St. Louis and State of Missouri, have invented certain new and useful Improvements in Means for Preventing Smoke, of which the following is a specification.

This invention relates to means for preventing smoke; and it consists, generally stated, in improvements on the apparatus shown and described in my Letters Patent No. 749,734, dated January 19, 1904.

Figure 1:
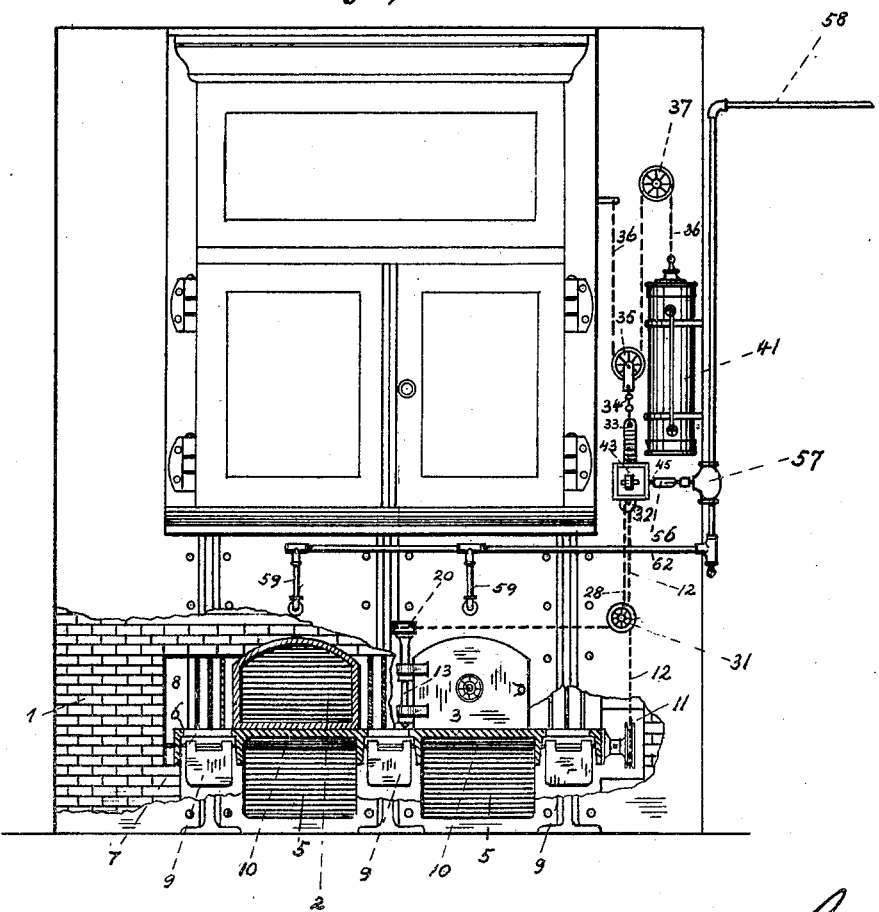
Figure 2:
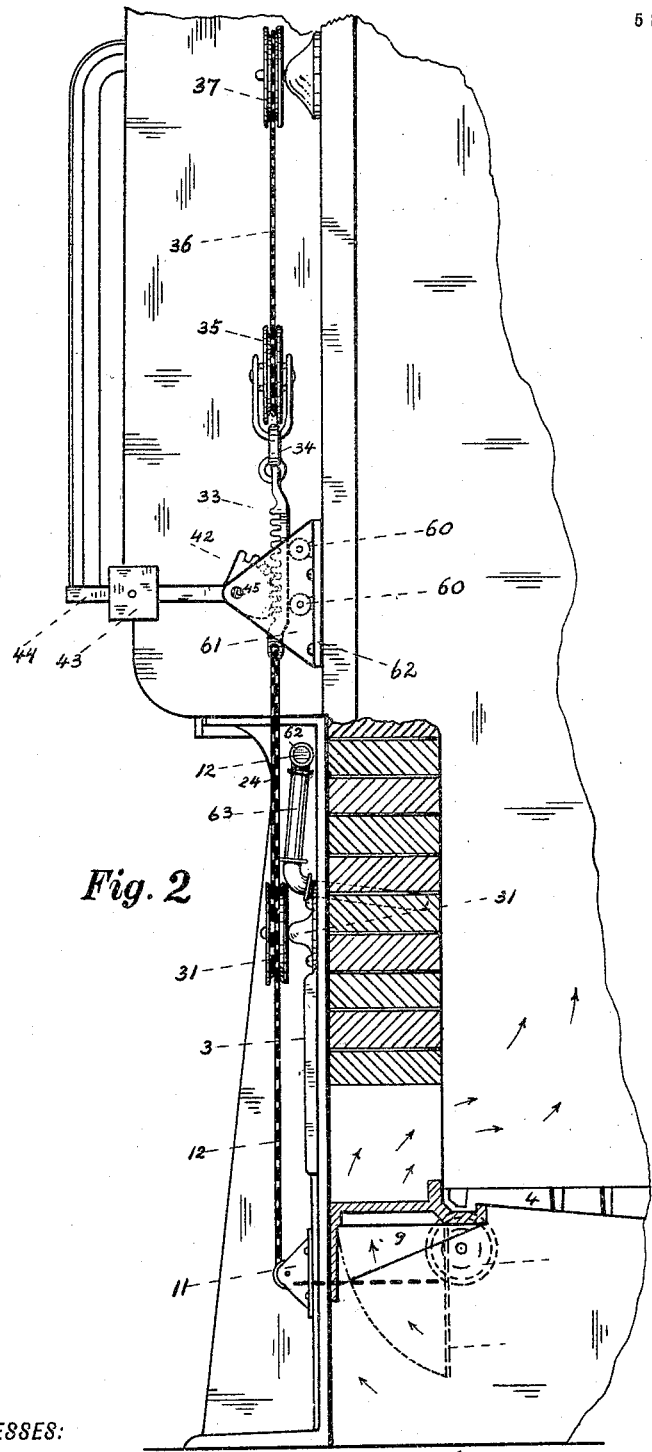
Figure 3:
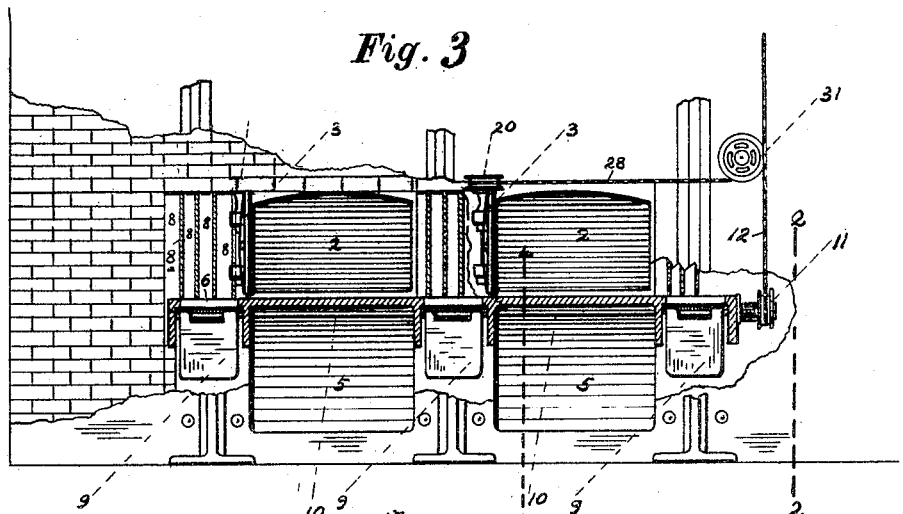
Figures 6, 7:
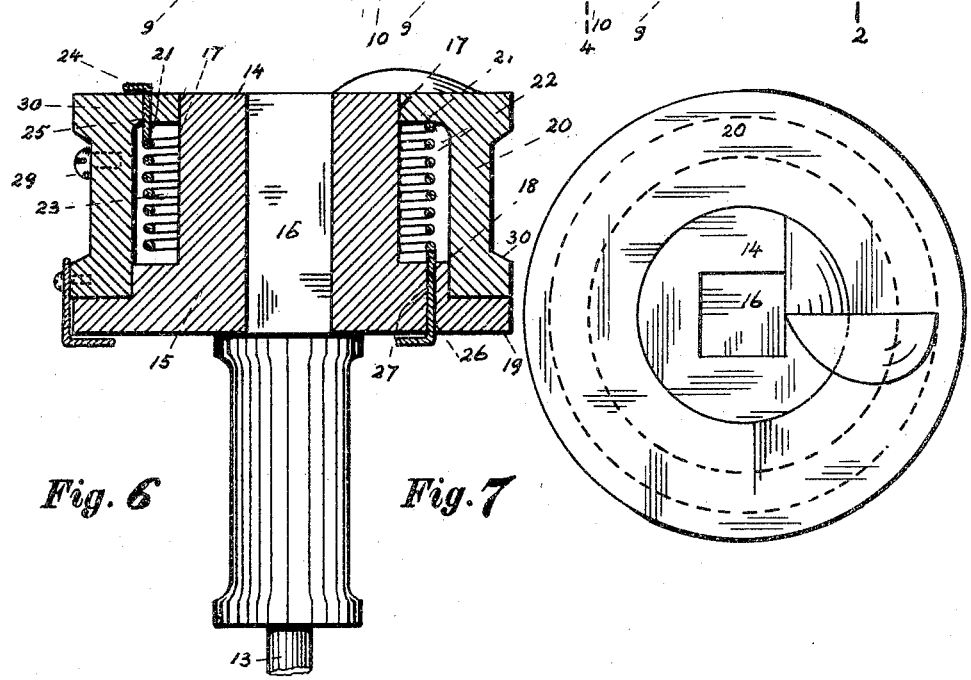
Figure 5:
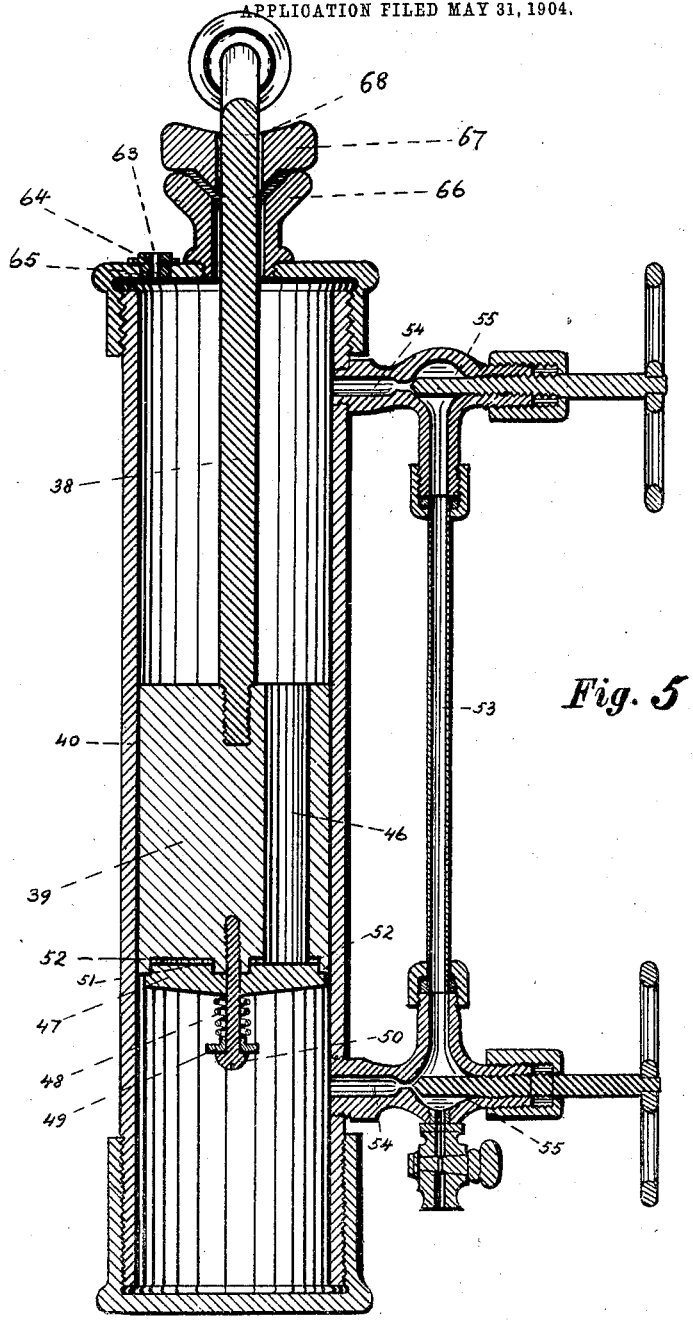

In the drawings, in which like numbers of reference denote like parts wherever they occur, Figure 1 is a front elevation, partly broken away and partly in section. Fig. 2 is a side elevation, partly in section, on the line 2 2, Fig. 3. Fig. 3 is a front elevation, partly in section, showing the furnace-doors open and the dampers down. Fig. 4 is a vertical section on the line 4 4, Fig. 3. Fig. 5 is a vertical sectional view through the dash-pot. Fig. 6 is a sectional view through the pinion attached to the hinge-pin of one of the furnace-doors. Fig. 7 is a top plan view of the same, and Fig. 8 is a top plan view of the weight and counterbalance for automatically closing the dampers.

The furnace 1 may be of any ordinary or desired construction and has in its front walls the fire-openings 2, which may be of any desired number. These fire-openings are closed by suitable doors 3 and have behind them the ordinary grate-bars 4, underneath which are located the ash-pits 5. Through the dead-plate 6 apertures or openings 7 are formed, which lead to chambers 8, which have arranged therein vertical plates 8ª spaced apart, providing a plurality of superheating passages or compartments in which the air at atmospheric temperature admitted by the dampers 9 through the openings 7 will be raised to a higher temperature preliminarily to being admitted to the combustion-chambers. The dampers 9 are rigidly mounted on the rod 10, which runs underneath the dead-plate from the furthermost damper to a point beyond the side wall at the front of the furnace, as clearly shown in Fig. 1. To the outer end of the rod 10 is attached a wheel or pulley 11, around which a belt or chain 12 passes. If a plurality of furnace-doors are arranged side by side, it will be understood that the rod 10 will be extended so as to pass underneath the dead-plate in all and be provided with a plurality of dampers corresponding to the number of furnace-doors.

On the hinge-pin 13 of one of the doors 3 is mounted a pinion 14, which comprises a central core 15, having pierced therethrough a rectangular-shaped opening which contains the rectangular projection 16 from the hinge-pin 13, said projection being formed integral with the latter. The core 15 is reduced in diameter through the major portion of its length, as at 17, but in its lower portion has formed therearound the circumferential boss 18 and below the latter the peripheral flange 19. Upon said flange 19 rests a spool 20, which is provided in its upper portion with the inwardly-turned flange 21, so as to form the groove or space 22 between said spool 20 and the core 15. In the said space 22 is located a helical spring 23, having the projection 24 thereon passing through the opening 25 in the flange 21 of the spool 20 and at its other end the projection 26 passing through the opening 27 in the core 15. When the fireman begins to fire the furnace, he will begin with the furnace-door in the furnace having a pinion of the character described attached to its hinge-pin 13. On opening that door 3 the hinge-pin 13 turns with the door. A light cord or chain 28 is attached to the spool 20 by means of bolt 29. The spool 20 is formed with the flanges 30, and the chain 28 travels to the left, passing the idler-pulley 31, and winds upon spool 20. Chain 28 is connected by the hook or ring 32 to the rack-bar 33. The rack-bar 33 is further connected by the rings or chain 34 to the pulley 35, which travels on the depending chain 36. Said chain 36 passes over the stationary wheel or pulley 37 and at its other end is attached, by means of a ring, to the piston-rod 38, carrying the piston 39, which reciprocates in the cylinder 40 of the dash-pot 41. When the door 3 is opened, as above described, the chain 28 passes downwardly and to the left around the idler 31 and winds upon the spool 20. The rack-bar 33 travels downwardly and actuates the toothed segment 42, causing it to rotate downwardly and at the same time to elevate the weight 43 adjustably mounted on the lever 44, said segment and lever being pivoted on the fulcrum 45. At the same time the pulley 35 and chain 36 are depressed, and as the chain 36 travels around the stationary pulley 37 the piston 39 is pulled upwardly in the cylinder 40. This causes the forcible expulsion of the oil or other fluid in the upper portion of the cylinder 40 through the passage 46, thereby opening the valve 47, which comprises a disk normally held in position against the lower end of the piston 39 by the spring 48, which is located between the valve or disk 47 and the head 49 of the screw 50. An airspace 51 is provided between the valve 47 and the end of the piston 39, due to a recess formed in the head of the piston, by which means it is provided that the valve 47 bears against the piston-head only in a very small portion, (designated at 52.) This insures the close fitting and seating of the valve at all times. When the rack-bar 33 descends, as hereinabove described, its downward motion allows the chain 12 to descend by gravity, being chiefly thereto aided by the weight of the dampers 9, mounted on the rod 10, to which latter is attached the wheel 11 around which the chain 12 winds. The door 3 having been opened, as before referred to, the rack-bar 33 having descended, as just mentioned, the dampers 9 having also fallen open by gravity, and the piston 39 being at its point of greatest upward elevation, the firing begun proceeds in one or more fire-openings 2 and usually in succession. As the piston 39 is preferably formed of a heavy material and as the weight 43 is made equal in quantity and by adjustment on the lever 44 exactly to counterbalance the weight of the dampers 9, the piston 39 immediately begins to descend in the cylinder 40, being hindered therein only by the presence of the oil or other fluid in the lower portion of the cylinder 40. At this time the valve 47 seats closely against the piston-head 39 and closes the passage 46. This necessitates its escape through the by-pass 53, which communicates at both its end by the openings 54 to the interior of the cylinder 40. At this point are located the valves 55, which provide means whereby the flow of the oil through the by-pass 53 may be adjusted or particularly controlled. It will now be obvious that as the piston 39 descends in the cylinder 40 it pulls after it the chain 36 over the stationary wheel 37, thus raising the movable pulley 35, the rack-bar 33 at this point coöperating with the toothed segment 42 and the weight 43, mounted on lever 44, and also raising the chain 12, so that it unwinds from the wheel 11, thus rotating the rod or bar 10 and automatically causing the dampers 9 to close. The chain 28 raises at the same time, unwinding from the spool 20, but being held taut by the presence of the spring 23, which does not allow the spool 20 to revolve on the core 15 of the pinion 14 sufficiently for the chain 28 to become loose. The axis of rotation of the lever 44 with its attached weight 43 is arranged to be the same as the axis of rotation of the dampers 9, insuring exact automatic action.

The pin or fulcrum 45 may be extended outward, as shown in Fig. 1, through a sleeve 56 to operate a valve located at 57 to control the admission of steam where it is desired to utilize steam to induce a draft when same is deficient or when it is desired to force the boilers by increasing the draft. It will be obvious from the preceding description of the operation of the rack-bar 33 and the segment 42 that the pin 45 will rotate at such a time as to produce an automatic opening of the valve 57 to allow the admission of steam through the steampipe 58 and branch pipes 59.

The rack-bar 33 is located between the segment 42 and the rollers 60, so as to insure greater ease of movement of said rack-bar 33, the rollers 60 being located within the two wings 61 of the guide 62, said guide serving to keep the rack-bar 33 in fixed relation to said rollers 60 and the segment 42.

In the construction of the dash-pot I find it preferable to provide a perforation or airhole 63, formed in the plug 64, which is screwed into the opening 65 in the top of the dash-pot, so that when the parts operate to raise the piston 39 the air may escape through the opening 63 while the oil is making its way through the by-pass 53. This arrangement prevents the oil bubbling along the piston-rod, as would be the case if the air did not have some ready mode of exit while the piston-rod is entering the cylinder 40. Moreover, in arranging the stuffing-box through which the piston-rod 38 enters the cylinder 40 I prefer instead of the ordinary construction to use a loose-fitting bushing 66, preferably made of brass, with plenty of clearance for the piston-rod, so as to avoid friction. To seal same and prevent the oil from escaping from cylinder 40, I use a packing-washer 67, fitting the rod 38 very closely. Said washer 67 rides loosely on the rod 38, and its own weight keeps it seated, so that when the piston is raised the rod 38 passes up and through the packing-washer 67 without lifting same. This construction has the additional advantage of allowing a slight crossmotion in the bushing, which may sometimes arise, due to the bushing or the rod being slightly off center. The concave portion 68 is formed in the packing-washer 67, so that if any oil should follow the rod it will remain in said concave cup 68 and return with the rod into the cylinder 40.

I reserve to myself the right to file separate applications for patents on the particular construction of the dash-pot, hereinbefore described, and illustrated in the drawings, and also the particular form of pinion attached to the furnace-doors, as well as other items of invention that cannot be specifically claimed in the present application.

Having thus described my said invention, what I claim, and desire to secure by Letters Patent, is—

1. In a device of the character described, the combination with the dampers of a hinge-pin to a furnace-door, a core mounted thereon and rotating therewith, a spool mounted on but independent of said core, a spring for maintaining a yielding relation between said core and said spool, a chain adapted to wind upon said spool, means actuated by said chain for allowing the dampers to open simultaneously with the opening of a furnace-door, and means for closing the dampers, substantially as described.

2. In a device of the type set forth, the combination with a furnace-door and the dampers, of means yieldingly supported from the door to rotate therewith, a chain connected to said means, a second chain, a dash-pot and plunger, said second chain being connected to said plunger at its one end and suitably supported at its other end, a pulley supported by an intermediate portion of said second chain, a rack-bar connected to said pulley and said first chain, means for moving the dampers a third chain connecting said last-named means and said rack-bar and a lever having a toothed segment engaging said rack-bar and being weighted at its outer end.

3. The combination with a furnace-door and the dampers, of flexible means connected to said door and said dampers whereby opening of said door opens said dampers, a rack-bar, a dash-pot and plunger, flexible means connected to said plunger and movably supporting said rack-bar, said first-named means each being connected to said rack-bar, and a weight operated by said bar, for counterbalancing said parts.

4. The combination with a furnace-door and the dampers, of a rack-bar, separate means connected at their one end to said door and dampers and at their other end to said bar whereby opening of said door opens said dampers, means for movably supporting said bar, and a weight operated by said bar, to counterbalance said parts.

5. The combination of a furnace-door and the dampers, of yielding means supported from the door to rotate therewith, a movable rack-bar, chains connected to said means and said dampers at their one end and to said rack-bar at their other end, and a lever weighted at its outer end and provided with a segment engaging said rack on its inner end.

6. The combination of a furnace-door and the dampers, of a bar, means for movably supporting said bar, flexible means connected to the door and the dampers and to said bar, whereby opening of the door will open said dampers, and a counterweighted lever actuated by the movements of said bar, for counterbalancing said parts.

7. The combination of a furnace-door and the dampers, of chains connected to said door and dampers whereby opening of the door will open said dampers, movable means connected to each of said chains, means for supporting said movable means, and a counterweighted lever operated by said movable means, to counterbalance said parts.

8. The combination of a furnace-door, and the dampers, a bar connected to said door and dampers whereby opening of the door will open said dampers, means for movably supporting said bar, and a lever fulcrumed intermediate its ends for actuatiom by said bar, said lever on its outer end being counterweighted, to counterbalance said parts.

In testimony whereof I have affixed my signature, in presence of two witnesses, this 25th day of May, 1904.

HERBERT H. HUGHES.

Witnesses:
HUGH K. WAGNER,
GLADYS WALTON.